(12) United States Patent
Searls et al.

(10) Patent No.: US 8,903,777 B1
(45) Date of Patent: Dec. 2, 2014

(54) APPLICATION BACKUP USING UNIFIED BACKUP METHODOLOGIES

(75) Inventors: Kirk L. Searls, Maitland, FL (US); Ynn-Pyng "Anker" Tsaur, Oviedo, FL (US)

(73) Assignee: Symantec Corporation, Mountain View, CA (US)

( * ) Notice: Subject to any disclaimer, the term of this patent is extended or adjusted under 35 U.S.C. 154(b) by 910 days.

(21) Appl. No.: 12/405,747

(22) Filed: Mar. 17, 2009

(51) Int. Cl.
G06F 17/30 (2006.01)

(52) U.S. Cl.
USPC ............................................. 707/665

(58) Field of Classification Search
USPC ............................................. 707/665
See application file for complete search history.

(56) References Cited

U.S. PATENT DOCUMENTS

| | | | |
|---|---|---|---|
| 6,434,681 B1 * | 8/2002 | Armangau | 711/162 |
| 6,505,216 B1 | 1/2003 | Schutzman et al. | |
| 6,976,039 B2 | 12/2005 | Chefalas et al. | |
| 7,051,053 B2 | 5/2006 | Sinha | |
| 7,093,230 B2 | 8/2006 | E et al. | |
| 7,149,729 B2 | 12/2006 | Kaasten et al. | |
| 7,162,601 B2 | 1/2007 | Yamagami | |
| 7,237,075 B2 | 6/2007 | Welsh et al. | |
| 7,284,104 B1 | 10/2007 | Wu et al. | |
| 7,401,194 B2 | 7/2008 | Jewell | |
| 7,409,414 B2 | 8/2008 | Okada et al. | |
| 7,409,644 B2 | 8/2008 | Moore et al. | |
| 7,620,765 B1 * | 11/2009 | Ohr et al. | 711/4 |
| 2005/0021869 A1 * | 1/2005 | Aultman et al. | 709/249 |
| 2006/0106896 A1 | 5/2006 | Carlson | |
| 2007/0083355 A1 | 4/2007 | Collins | |
| 2009/0313447 A1 * | 12/2009 | Nguyen et al. | 711/162 |

OTHER PUBLICATIONS

Shultz, "An in-depth look at Windows Vista's Virtual Folders technology", Techrepublic.com; CNET Networks, Inc.; Oct. 12, 2005, 5 pages. (Printed from http://articles.techrepublic.com.com/5100-10878_11-5893800.html?tag=sc ).
"Windows Vista Searches (Virtual Folders);"Computer Performance Ltd.; downloaded from Internet Aug. 5, 2008; 3 pages. (Printed from http://www.computerperformance.co.uk/vista/vista_virtual.htm ).

* cited by examiner

Primary Examiner — Hosain Alam
Assistant Examiner — Johnese Johnson
(74) Attorney, Agent, or Firm — Rory D. Rankin; Meyertons, Hood, Kivlin, Kowert & Goetzel, P.C.

(57) ABSTRACT

A computer system and methods. The computer system includes a host that hosts applications and includes storage volumes. The host identifies an application and associated first files to be protected. The first files are stored on a first volume. The host performs a file-by-file backup of the first files to a first backup medium. The host identifies a second volume to be protected and performs a volume image backup of the second volume to a second backup medium. The host identifies second files that are associated with the identified application and stored on the second volume and stores metadata in a third backup medium including application-specific references to data objects that correspond to the second files. Third files not associated with the identified application are stored on the first volume and not included in the file-by-file backup. The second files are not included in the file-by-file backup.

17 Claims, 9 Drawing Sheets

APPLICATION BACKUP USING UNIFIED BACKUP METHODOLOGIES

BACKGROUND OF THE INVENTION

1. Field of the Invention

This invention relates to computer systems and, more particularly, to backup and restoration of data within computer systems.

2. Description of the Related Art

There is an increasing need for organizations to protect data that resides on a variety of client devices via some type of backup mechanism. For example, numerous client devices may be coupled to a network to which one or more media servers are also coupled. The media servers may include or be further coupled to a storage unit consisting of one or more disk storage devices, tape drives, or other backup media. Media servers and backup media may provide low-cost, long-term archival storage of data. A backup agent on each client device may convey data files to the media server for storage according to a variety of schedules, policies, etc. Large backup datasets may be moved from a client device to a media server configured to store data for later retrieval, thereby protecting data from loss due to user error, system failure, outages, and disasters, etc. as well as archiving information for regulatory compliance, workflow tracking, etc.

Different backup approaches may be used in different circumstances. For example, if a user desires to protect a complete volume, a volume backup may be performed in which the entire contents of a particular disk drive are stored as a monolithic backup dataset. Volume backups may provide the advantage of rapid restoration. However, volume backups consume storage resources for data that may not need to be protected. For example, there may be times when protection may be desired for data related to one or more applications only.

An alternative approach to data protection is file-by-file backup. In file-by-file backup, a backup agent may identify a particular application to be protected and convey a copy of only those files that are related to the identified application to a backup medium including any metadata that may be required to restore the application-related files into the context of the application. File-by-file backups may therefore consume less storage space than volume backups. However, restoration from a file-by-file backup may be slower than restoration from a volume backup. Typically, to restore files to an application, the backup files may be copied to a temporary location from which a user may browse, search or otherwise select files to be restored. While this approach allows for granular recovery of data files, it may be unnecessarily time-consuming.

File-by-file backups and volume-level backups each have their advantages. However, issues may arise when a user wants the advantages of volume-level backups for some drives, but not for others. For example, if a user wants to protect data for an application that spans multiple volumes and at the same time wants volume-level protection for at least one of the drives, it is difficult for a backup system to satisfy all of the user's needs. If all for the volumes are protected via volume-level backups, storage space may be wasted backing up much more data than is needed. Alternatively, if all of the application's data is backed up using file-by-file techniques in addition to backing up selected volumes using volume-level backup, storage may be wasted storing duplicate data and/or data that the user did not want to be backed up.

In view of the above, an effective system and method for allowing a backup application to efficiently protect data for applications using a variety of storage configurations that accounts for these issues is desired.

SUMMARY OF THE INVENTION

Various embodiments of a computer system and methods are disclosed. In one embodiment, a computer system includes a host that hosts one or more applications and includes one or more storage volumes. The host identifies an application and associated first files to be protected. The first files are stored on a first volume. The host performs a file-by-file backup of the first files to a first backup medium. The host identifies a second volume to be protected and performs a volume image backup of the second volume to a second backup medium. The host identifies second files that are associated with the identified application and stored on the second volume and stores metadata in a third backup medium including application-specific references to data objects that correspond to the second files.

In one embodiment, third files not associated with the identified application are stored on the first volume and not included in the file-by-file backup. In a further embodiment, the second files are not included in the file-by-file backup.

In a still further embodiment, the first and second backup media are a same medium and the host stores a backup dataset on the same medium. The backup dataset includes file-by-file copies of the first files and a volume image of the second volume. In a still further embodiment, the third backup medium comprises a backup catalog stored on a backup media server.

In another further embodiment, the host identifies a state of the application to be restored, performs a granular restoration of at least a portion of the first files and uses the metadata to perform a restoration of the second files. In a still further embodiment, the host mounts a volume image of the second volume and a copy of the first files on a media server. The host performs the granular restoration of the at least a portion of the first files from the copy of the first files and a file-by-file restoration of the second files from the volume image.

These and other embodiments will become apparent upon consideration of the following description and accompanying drawings.

Figure 1:
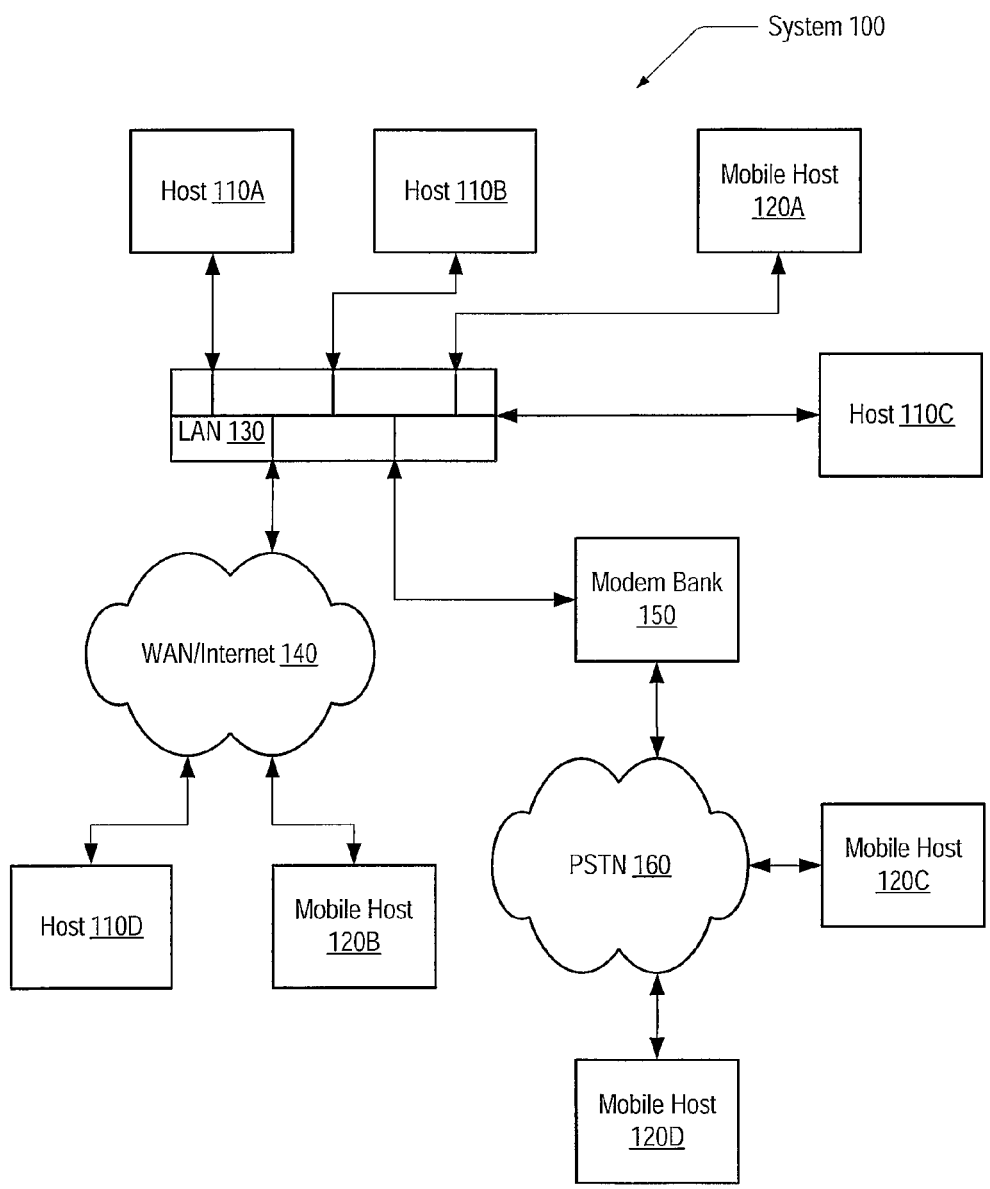
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computer system 100. As shown, system 100 includes hosts 110A-110D and mobile hosts 120A-120D interconnected through a network that includes a local area network (LAN) 130 coupled to a wide area network WAN/Internet 140 and a modem bank 150, which is in turn coupled to a public switched telephone network (PSTN) 160. Hosts 110A-110D are representative of any number of stationary computers. Mobile hosts 120A-120D are representative of any number of mobile client computing devices such as laptops, handheld computers, etc. Both hosts and mobile hosts may operate as peers in a peer-to-peer configuration or as clients and servers in a client/server configuration.

In alternative embodiments, the number and type of hosts, LANs, WANs, and modem banks is not limited to those shown in FIG. 1. Almost any number and combination of server, desktop, and mobile hosts may be interconnected in system 100 via various combinations of modem banks, direct LAN connections, wireless connections, WAN links, etc. Also, at various times one or more hosts may operate offline. In addition, during operation, individual host connection types may change as mobile users travel from place to place connecting, disconnecting, and reconnecting to system 100.

Figure 2:
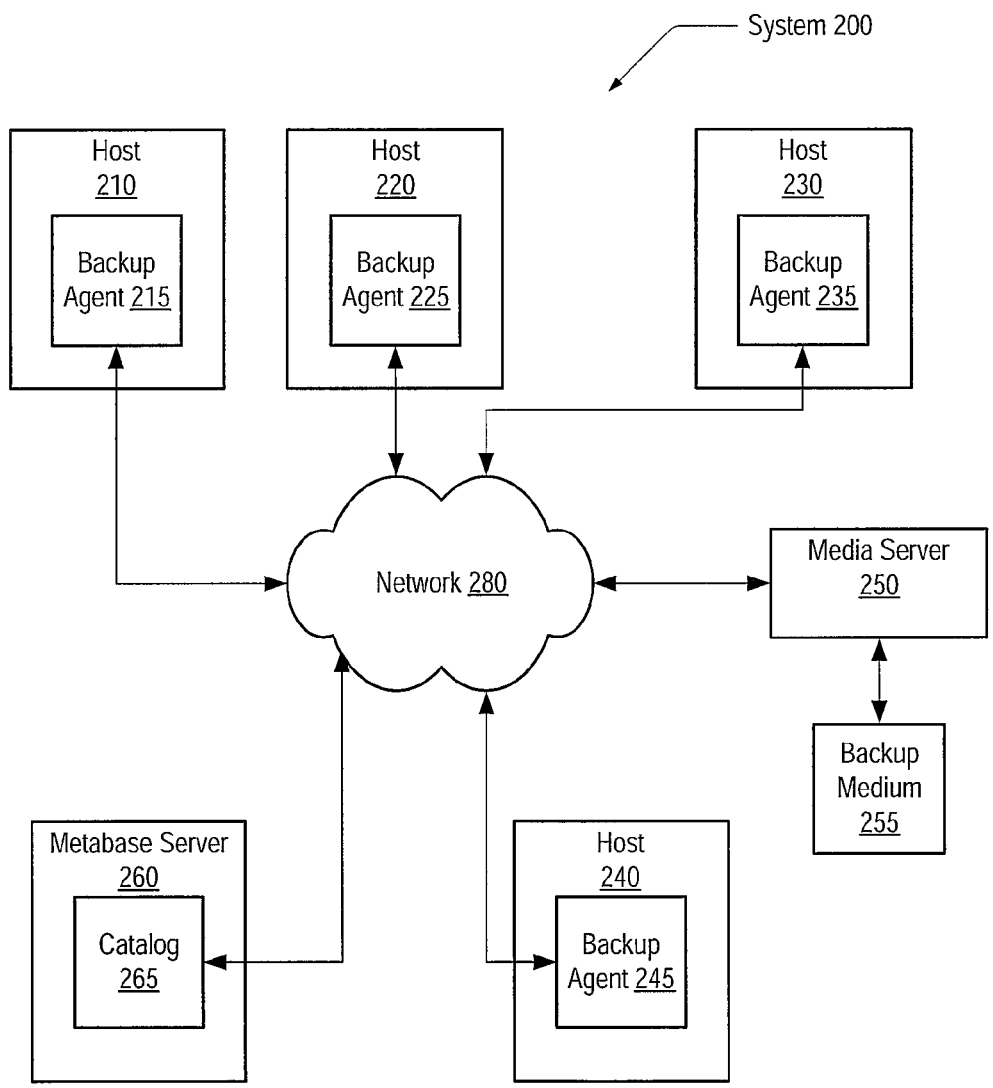
FIG. 2 is a generalized block diagram of one embodiment of a backup system.

Within system 100, it may be desired to protect data associated with any of hosts 110A-110D and mobile hosts 120A-120D. In order to protect host-associated data, various backup components may operate on hosts 110A-110D and mobile hosts 120A-120D. Turning now to FIG. 2, a generalized block diagram of one embodiment of a backup system 200 that may operate within system 100 is shown. System 200 includes hosts 210, 220, 230, and 240 coupled through network 280 to a media server 250 and a metabase server 260. Backup agents 215, 225, 235, and 245 operate on hosts 210, 220, 230, and 240, respectively. In the illustrated embodiment, media server 250 is further coupled to a backup medium 255 in which a copy of data from one or more hosts may be stored. In one embodiment, backup medium 255 may be part of or included in backup server 250. Metabase server 260 includes a catalog 265 on which may be stored metadata describing the data stored on backup medium 255. Additional metabases may be included in system 200 in alternative embodiments. Additional backup data may also be included in system 200, depending on the storage requirements of the system.

During operation, backup agents 215, 225, 235, and 245 may perform data backups. For example, in one embodiment data may be conveyed to one or more backup data locations and associated metadata conveyed to one or more metabases. Backup frequency may depend on a variety of factors including the urgency of data protection, storage pool capacity, network connection state, and enterprise policies. In one embodiment, backups may be done according to a schedule or at other times determined by administrative policy, security policy, or to meet other requirements of an enterprise.

In order to minimize the size of backup data, single-instance storage techniques may be employed. In a single-instance storage pool, data is stored in segments, with each segment having an identifier or fingerprint that may be used to unambiguously identify it. For example, a data file may be segmented, and a fingerprint calculated for each segment. Duplicate copies of data segments are replaced by a single instance of the segment and a set of references to the segment, one for each copy. To retrieve a backup file, a set of fingerprints corresponding to the file's segments may be used as keys to locate the desired segments. Once the segments have been retrieved, they may be used to re-assemble the desired file.

Figure 3:
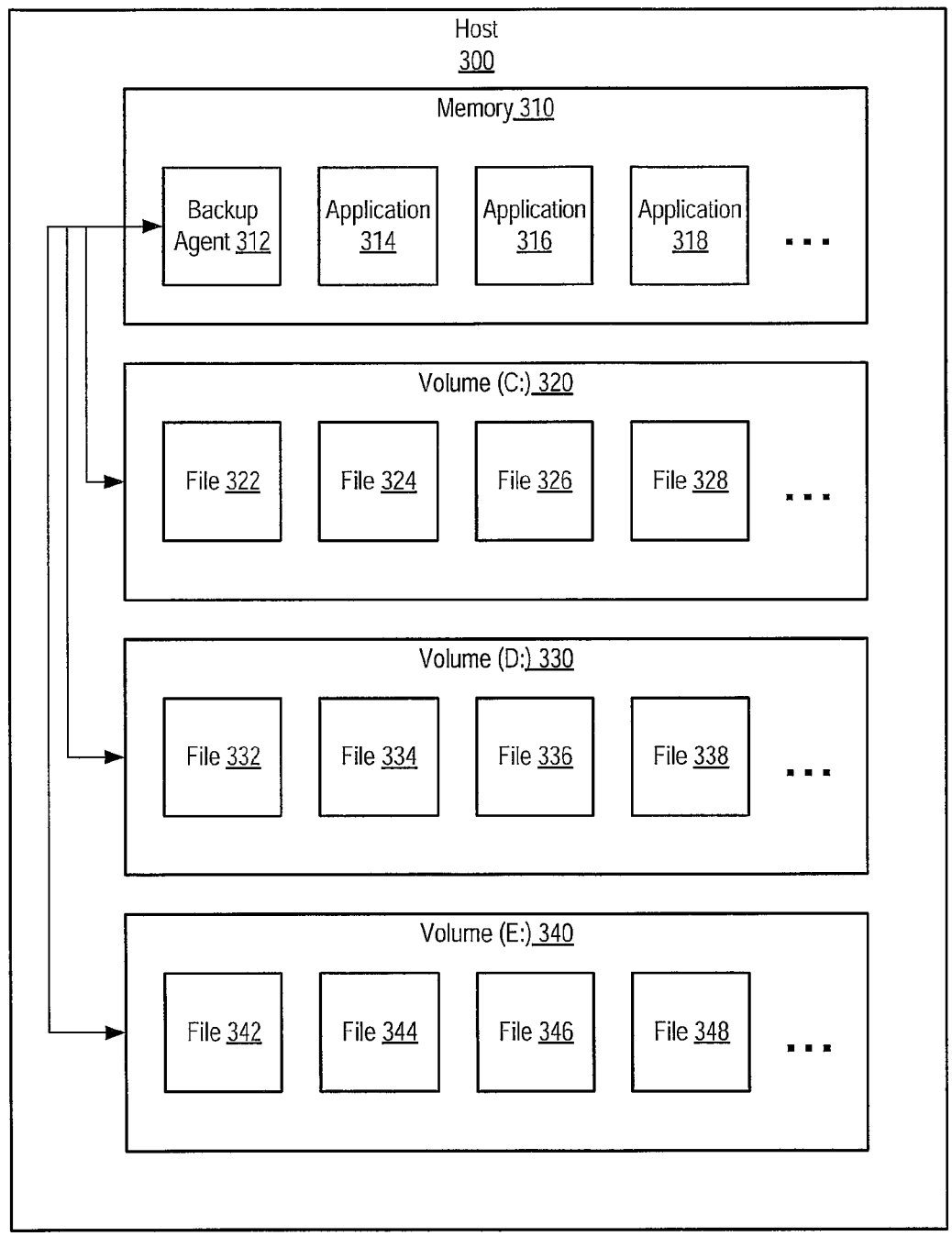
FIG. 3 is a block diagram of one embodiment of backup-related components within a single host.

FIG. 3 is block diagram of one embodiment of backup-related components within a single host 300. Host 300 is representative of one embodiment of any of hosts 210, 220, 230, or 240 as shown in FIG. 2. In the illustrated embodiment, host 300 includes a memory 310, a storage volume (C:) 320, a storage volume (D:) 330, and a storage volume (E:) 340. In addition, host 300 may include a variety of other devices, such as one or more processors, I/O interface devices (not shown), and other components commonly found in computer systems. Memory 310 may comprise any of a variety of types of storage technologies such as RAM, ROM, DRAM, SDRAM, EEPROM, etc. and may be implemented using memory modules (e.g., dual in-line memory modules (DIMMs), Rambus in-line memory modules (RIMMs), or single in-line memory modules (SIMMs)), etc. as known in the art. Volumes 320, 330, and 340 may be implemented using any of a variety of re-writable storage technologies. For example, volumes 320, 330, and 340 may comprise one or more hard disks, floppy disks, re-writable CDs or DVDs, etc. as known in the art.

In the illustrated embodiment, memory 310 includes a backup agent 312 and one or more applications such as applications 314, 316, 318, etc. In one embodiment, backup agent 312 may be part of a distributed backup application that includes other backup agents on other hosts coupled to a backup server. Each of applications 314, 316, 318, etc. may be an executable software program that is resident in memory 310. Each of applications 314, 316, 318, etc. may use data that is stored in memory 310 and/or on one or more of volumes 320, 330, and 340. Example applications include databases, email applications, e.g. Microsoft Outlook, email and collaboration servers, e.g. Microsoft Exchange and Microsoft SharePoint, and a variety of others as known in the art.

In the illustrated embodiment, each of volumes 320, 330, and 340 includes one or more files. For example, volume 320 may include files 322, 324, 326, and 328, etc., volume 330 may include files 332, 334, 336, and 338, etc., and volume 340 may include files 342, 344, 346, and 348, etc., as shown. Files stored on volumes 320, 330, and 340 may include data that is used by one or more of applications 314, 316, and 318 including documents, media files, log files and the like as well as other data such as operating system files, user data, etc.

During operation, backup agent 312 may be configured to protect data on behalf of one or more of applications 314, 316, and 318. For instance backup agent 312 may be configured to perform backup operations for data files stored on volumes 320, 330, and 340 and/or in memory 310. Backup operations may include any of a variety of operations known in the art such as backup and restore. Backup operations may be full backup or incremental backups. During a backup, agent 312 may create and store one or more backup datasets comprising a copy of an image of one or more of volumes 320, 330, and 340 and/or one or more of the files Backup agent 312 may store backup datasets on a backup medium such as backup medium 255 as shown in FIG. 2. During a restore, backup agent 312 may use a copy of one or more datasets retrieved from a backup medium to return one or more applications and/or volumes to a previous state. A backup operation may create a metadata file that is associated with one or more backup datasets that describes the data contained in the datasets and enables the above described restoration. Metadata files may be stored along with the datasets or on a separate metadata server such as server 260 as shown in FIG. 2. In one embodiment metadata files may be stored as a catalog, e.g. catalog 265 of FIG. 2 One embodiment of a metadata catalog is described further below.

In one embodiment, backup datasets may be created and stored in response to a user command in an ad hoc manner and/or at scheduled intervals. In one embodiment, backup agent 312 may construct a dataset according to selections made by the user. For example a user may desire to protect all data that is associated with a particular application. Alternatively or in addition, a user may desire to protect an entire storage volume. Accordingly, in one embodiment, a user interface may be provided (one embodiment of which is described further below) for selecting applications and volumes to be protected. If an application is selected, data that is associated with the application may be included in a backup dataset. If a volume is selected, an image of the volume may be included in a backup dataset.

Figure 4:
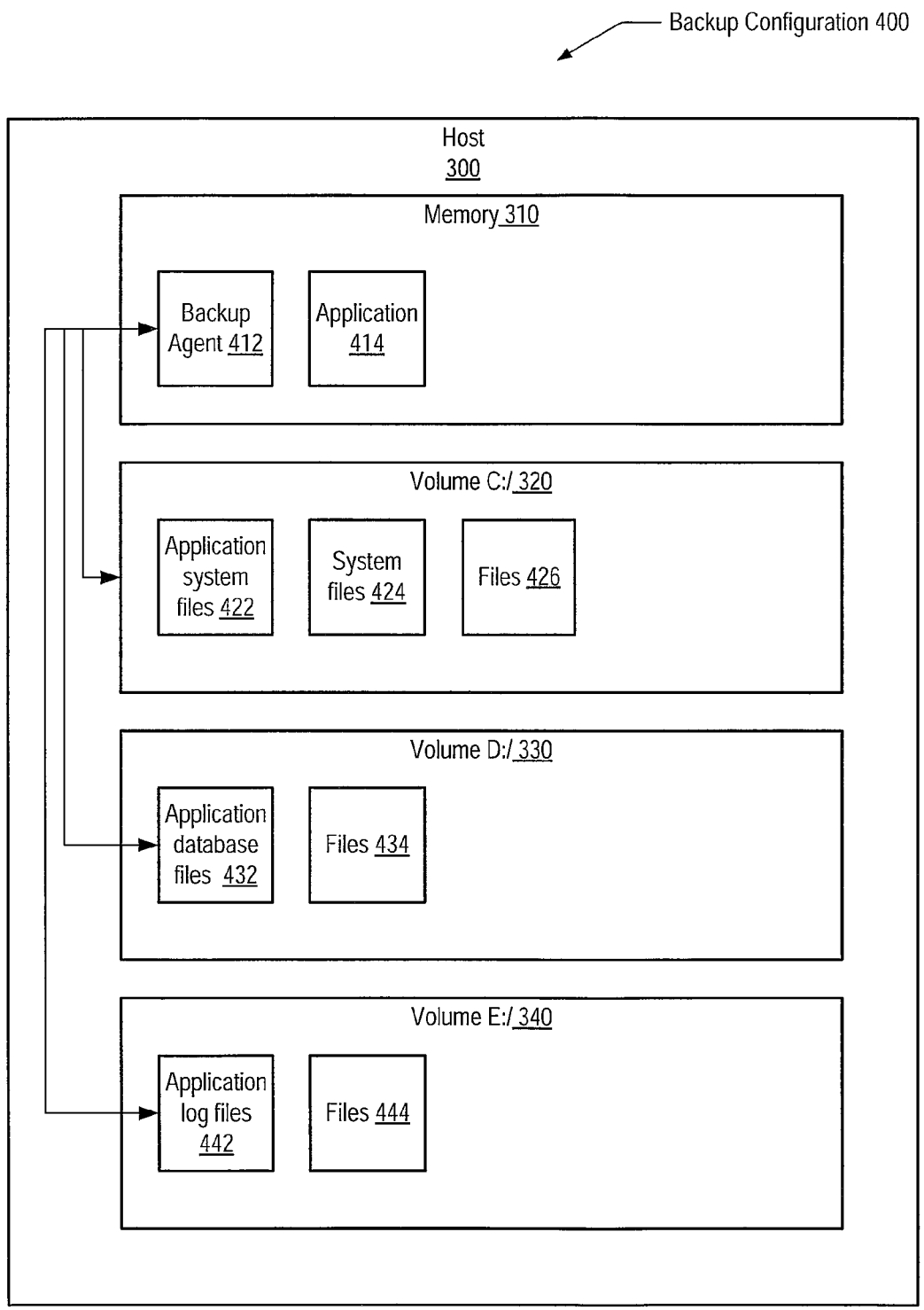
FIG. 4 illustrates one embodiment of a backup configuration of a host.

FIG. 4 illustrates one embodiment of a backup configuration 400 of host 300. Configuration 400 further illustrates the embodiment of backup-related components within host 300 shown in FIG. 3. In the illustrated example, memory 310 within host 300 includes an Application 414 and a backup agent 412. Backup agent 412 is coupled to volumes 320, 330, and 340. As shown, volume 320 includes Application system files 422, system files 424 associated with the operating system of host 300, and additional files 426. Volume 330 includes Application database files 432 and additional files 434. Volume 340 includes Application log files 442 and additional files 444.

In the example illustrated in FIG. 4, the user has chosen to protect volume 320 and data associated with Application 414, as indicated by arrows connecting backup agent 412 with volume 320 and each of Application database files 432 and Application log files 442. Accordingly, during a backup operation, backup agent 412 may construct a first backup dataset comprising an image of volume 320 and a second backup dataset comprising a copy of each of Application database files 432 and Application log files 442 as well as metadata referencing Application system files 422 within the first backup dataset, as described further below. The metadata referencing Application system files 422 allows these files to be restored as part of a backup operation in which Application 414 is to be restored to a previous state even without performing a volume image restore of volume 320 and even though a separate backup copy of Application system files 422 was not included in the second backup dataset. An example of the relationship between metadata and the first and second backup datasets is presented below.

Figure 5:
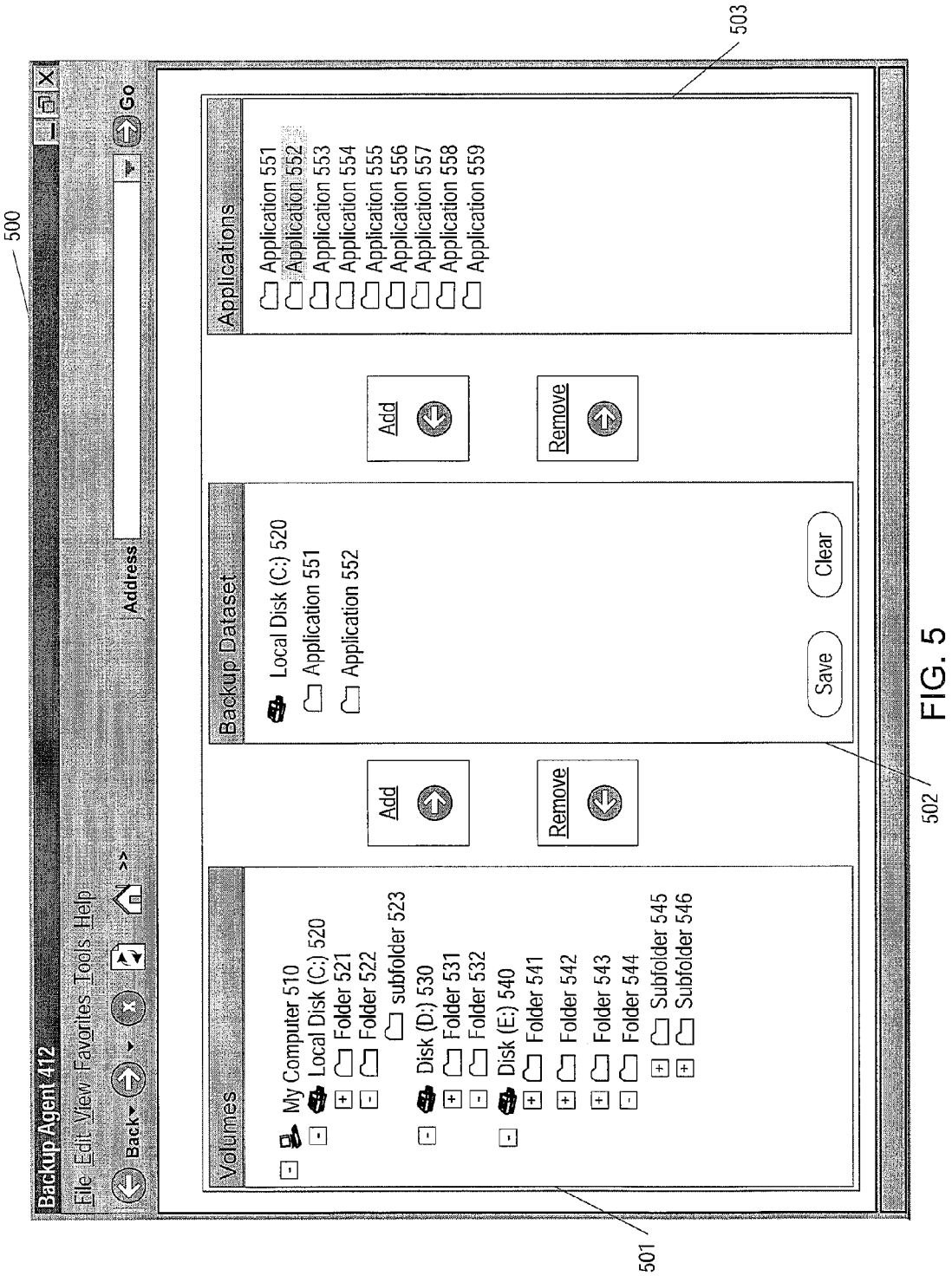
FIG. 5 illustrates one embodiment of a user interface that may be presented by a backup agent through which to select which applications and volumes are to be protected.

FIG. 5 illustrates one embodiment of a user interface 500 that may be presented by backup agent 312 through which to select which applications and volumes are to be protected. Interface 500 may include features such as drop-down menus, a navigation bar, an address field, and so on. Within the interface 500 are shown three panes, a Volumes pane 501, a Backup Dataset pane 502, and an Applications pane 503. Within Volumes pane 501, a hierarchy of containers, folders, and subfolders may be seen and navigated. The illustrated hierarchy includes a container labeled My Computer 510 at the highest level of the hierarchy. Below My computer 510 in the hierarchy are containers Local Disk (C:) 520, Disk (D:) 530, and Disk (E:) 540. Local Disk (C:) 520 includes Folders 521 and 522 and a subfolder 523. Disk (D:) 530 includes Folders 531 and 532. Disk (E:) 540 includes Folders 541, 542, 543, and 544 and Subfolders 545 and 546. Within Application pane 503, a list of applications may be seen and navigated. The illustrated list includes Applications 551-559. As illustrated in FIG. 5, Application 552 has been selected as indicated by its highlighted background. Within Backup Dataset pane 502, a list of the volumes and applications that have been selected for inclusion in a backup dataset may be seen. Volumes and Applications may be added to or removed from the list via Add and Remove buttons shown between panes 501, 502, and 503. The illustrated list includes Local Disk (C:) 520, Applications 551, and Application 552. Backup Dataset pane 502 also includes a save button and a Clear button. If the Save button is selected, the items listed in Backup Dataset pane 502 may be added to a backup dataset for use in a backup operation. If the Clear button is selected, the items listed in the Backup Dataset pane are removed from the pane. Once a backup dataset has been configured, such as via interface 500, a backup operation may be performed.

It is noted that the naming conventions depicted in FIG. 5 (e.g., "Subfolder 523", "File 545", "Application" etc.) are provided for ease of discussion. In a typical embodiment, names reflective of those used in ordinary business or other environments (e.g., Accounting, Payroll, Exchange, SharePoint, Office, etc.) may be used.

Figure 6:
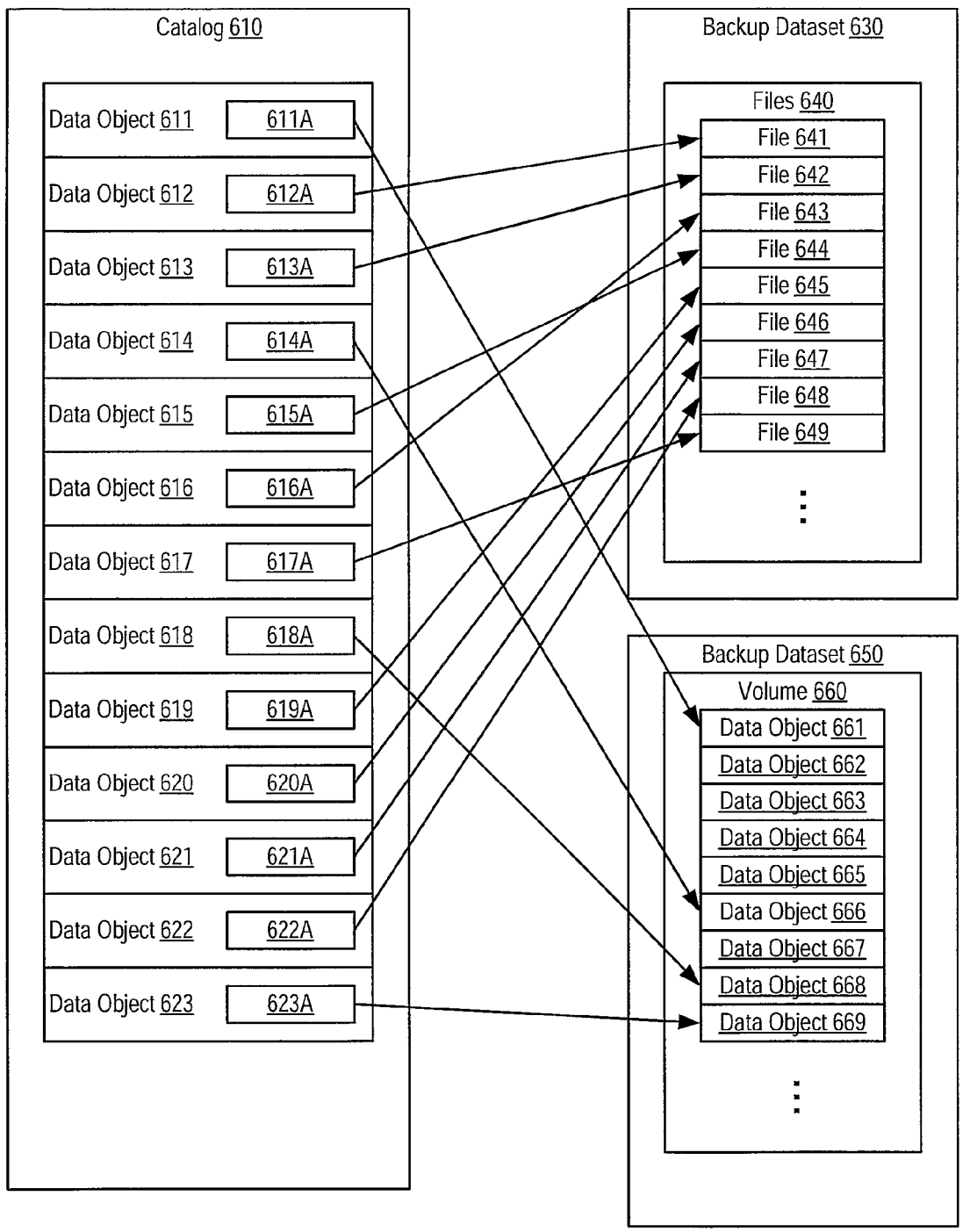
FIG. 6 illustrates one embodiment of a catalog and associated backup datasets that may be created during a backup operation.

FIG. 6 illustrates one embodiment of a catalog 610 and associated backup datasets 630 and 650 that may be created during a backup operation. Catalog 610 includes data objects 611-623, each of which include a reference (611A-623A, respectively) to a file or data object in a backup dataset. Backup dataset 630 includes files 641-649, etc. such as may be created during a file-by-file data protection operation for protecting one or more applications. Backup dataset 650 includes data objects 661-669, etc. such as may be created during a volume image backup data protection operation for protecting one or more complete volumes. In the illustrated embodiment, references 611A-623A refer to both files in backup dataset 630 and data objects in dataset 650. For example, reference 611A refers to data object 661, reference 612A refers to file 641, reference 613A refers to file 642, etc., as shown.

As used herein, a reference may include a pointer to the location of a data object in a backup dataset as well as various types of metadata. For example, in one embodiment, a reference may include application-specific metadata that is needed to return the data to which the reference refers to its original context in the application. Application-specific metadata may identify any of such items as a data object's associated application, object type, container object, version number, dependencies on other data objects, etc. In one embodiment, references and application-specific metadata may be stored as a file that is associated with one or more backup datasets using an XML or other format.

During a backup, data objects in catalog 610 may be created for each file that is copied during a file-by-file portion of the backup as well as each data object in a volume image portion of the backup that may be associated with an application that is protected by the file-by-file portion of the backup. Data objects in backup dataset 650 that are needed to protect an application may be identified during the file-by-file portion of the backup. A data object may be created in catalog 610 for each so-identified data object in backup dataset 650. During a restore operation, the data objects in catalog 610 that refer to data objects in the volume image may be used to return the application's data to a previous state.

In one embodiment, a single backup operation may be used to create catalog 610 and associated backup datasets 630 and 650. Alternatively, backup datasets 630 and 650 may be treated as a single backup dataset by the backup operation and subsequent restore operations. In a further alternative, a single backup operation may store references 611A-623A, files 641-649, and data objects 661-669 as a single backup dataset. Various alternative ways to organize and store references along with associated files and data objects may be used and are contemplated.

Figure 7:
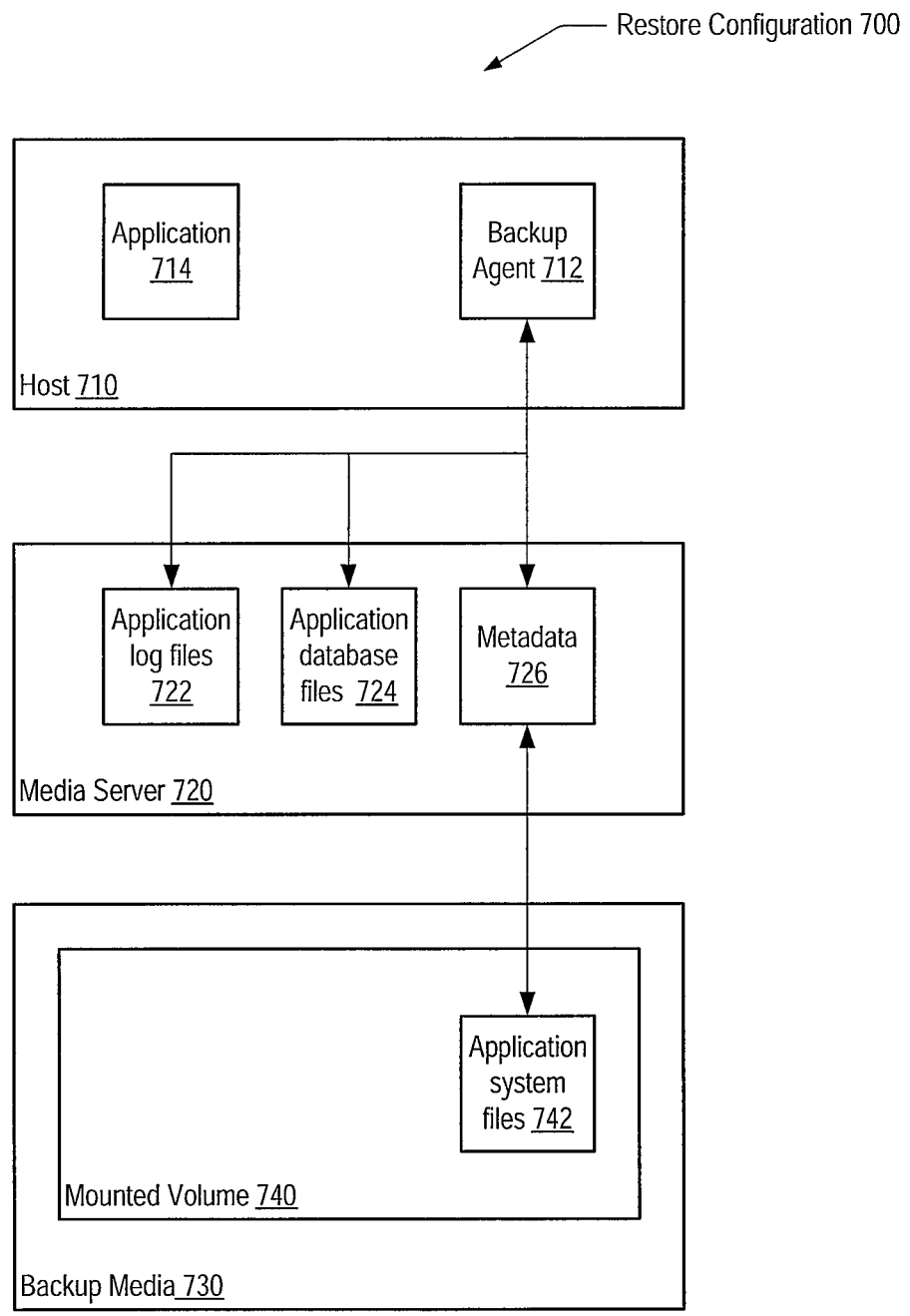
FIG. 7 illustrates one embodiment of a restore configuration.

FIG. 7 illustrates one embodiment of a restore configuration 700. Configuration 700 includes a host 710, a media server 720, and backup media 730. Host 710 hosts a backup agent 712 and an Application 714. Media Server 720 includes a copy of previously backed up Application log files 722, a copy of previously backed up Application database files 724, and metadata 726. Backup Media 730 includes a mounted volume 740 storing a previously backed up copy of Application system files 742. Metadata 726 includes references to Application system files 742 on volume 740.

Application 714 may generally correspond to Application 414 of FIG. 4, as described above. Application log files 722, Application data base files 724, and Application system files 742 may be copies of previously backed up Application log files 442, Application data base files 432, and Application system files 422 of FIG. 4, respectively. It is further assumed that Application system files 742 were backed up to backup media 730 as part of an image volume backup and that Application log files 722 and Application data base files 724 were backed up as part of a file-by-file backup. To restore the state of Application 714 to the state it held at the time these backups occurred, restore configuration 700 may be used as follows.

Application log files 722, Application database files 724, and metadata 726 may be mounted on media server 720 from their backup dataset locations. Volume 740 may remain on backup media 730 but be mounted as a volume on media server 720, that is, media server 720 may be provided file system access to the data stored in volume 740 on backup media 730. Backup agent 712 may then browse Application log files 722, Application data base files 724, and Application system files 742 and restore Application 714 to a previous state, using full database recovery, file-by-file recovery, or granular) recovery techniques. Granular recovery, as used herein, refers to recovering objects stored within database files, rather than recovering only complete database files. For example, granular recovery from an email database may recover individual emails rather than complete database files that include multiple emails. To restore files from Application system files 742, backup agent 712 may follow references found in metadata 726.

Figure 8:
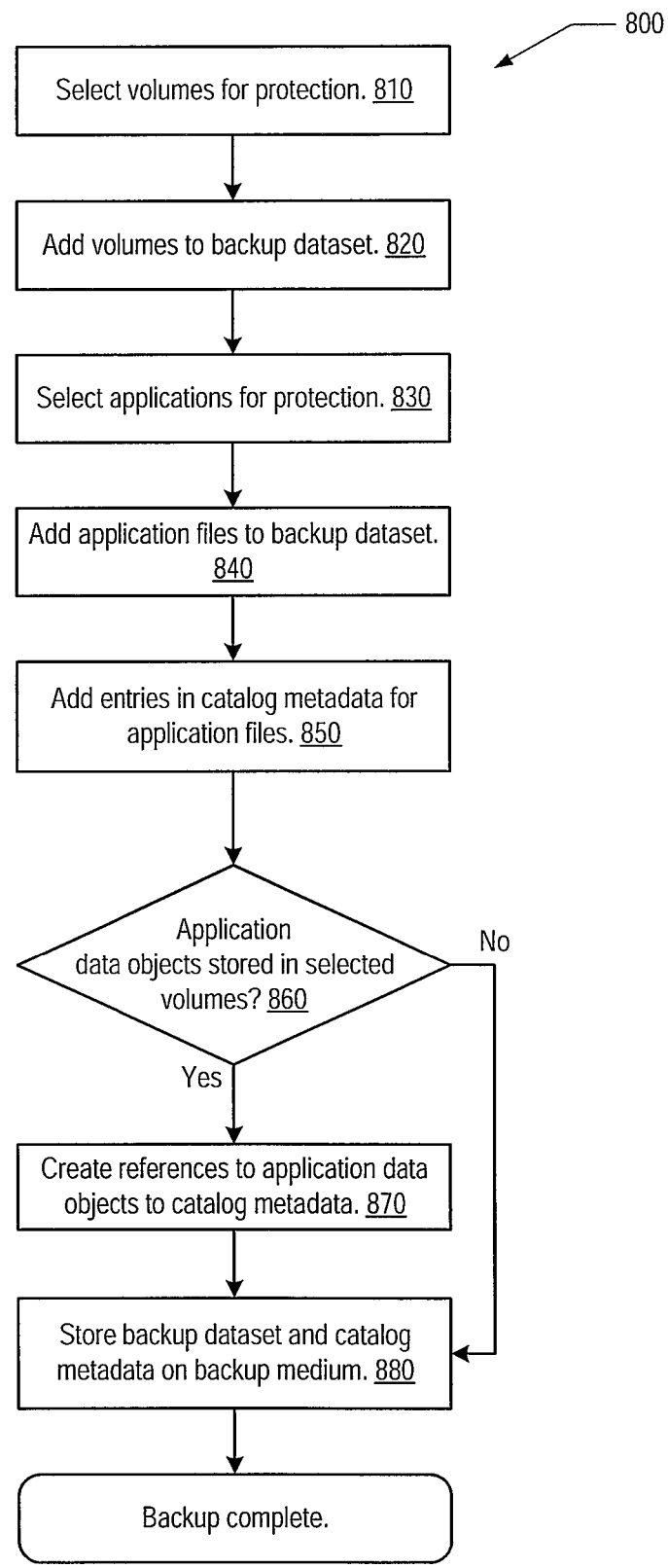
FIG. 8 illustrates one embodiment of a backup process.

FIG. 8 illustrates one embodiment of a backup process 800. Process 800 may begin with selection of one or more volumes to be protected via image volume backup (block 810). Each selected volume may then be added to a backup dataset (block 820). In addition, one or more application may be selected to be protected by a file-by-file backup (block 830). Individual files from each selected application may then be added to a backup dataset, file-by-file (block 840). Entries may be created in a backup catalog for each application file that is included in the file-by-file backup (block 850). For each data object in the selected volumes that is need to restore at least one of the selected applications to its current state (decision block 860), an entry may be created in the backup catalog that includes a reference to the data object (block 870). Once all of the backup catalog entries and references have been created or added, the backup dataset and catalog may be stored on a backup medium (block 880), completing backup process 800.

Figure 9:
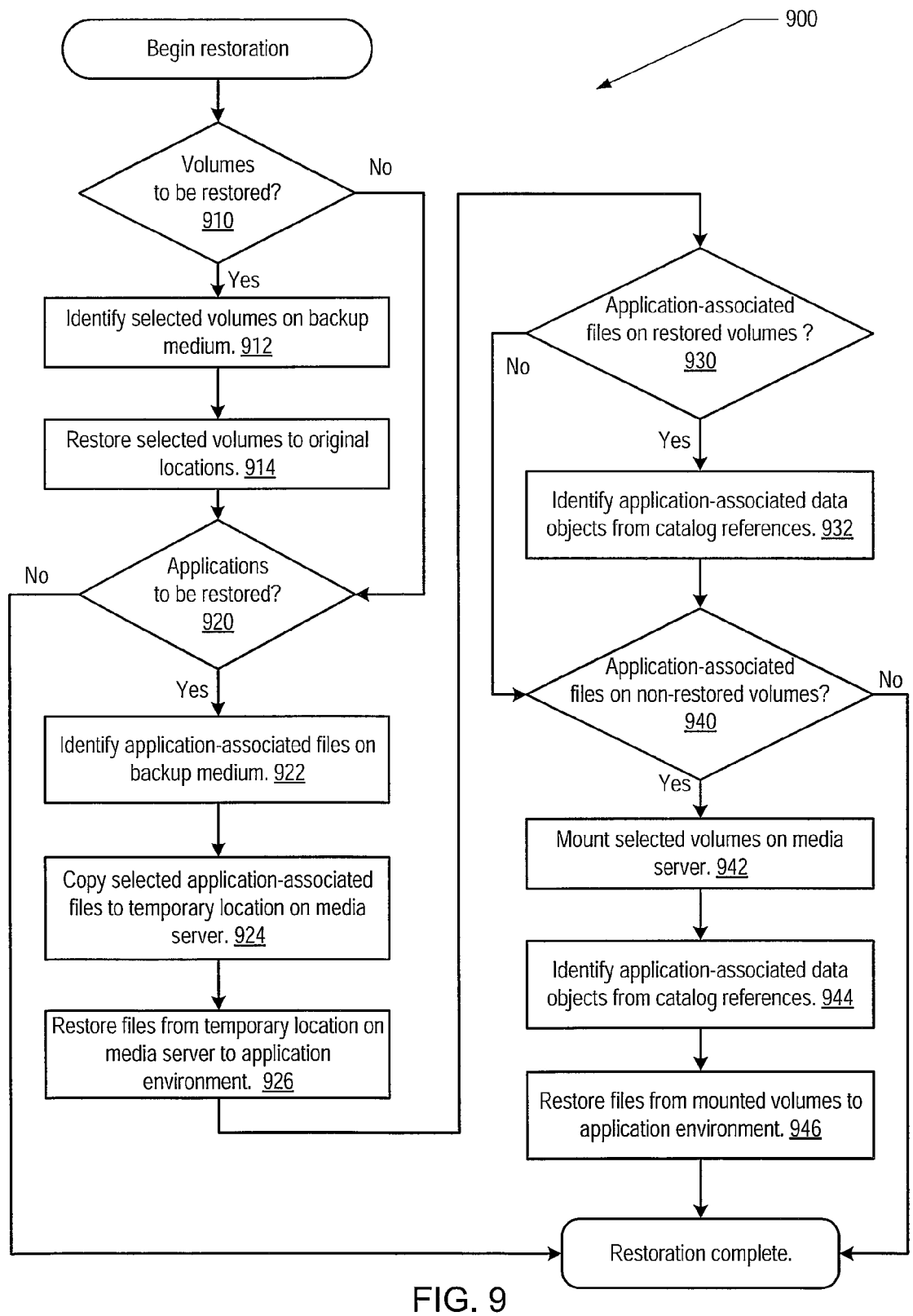
FIG. 9 illustrates one embodiment of a restore process.

FIG. 9 illustrates one embodiment of a restore process 900. Process 900 may begin with selection of volumes and/or application to be restored during a restore operation. If any volumes have been selected (decision block 910), the selected volumes may be identified on a backup medium (block 912) and restored to their original locations (block 914). Once the selected volumes have been restored or if no volumes have been selected and if no applications have been selected (decision block 920), restoration is complete. If one or more applications have been selected (decision block 920), files that are associated with the selected applications may be identified on a backup medium (block 922). The identified files may be copied to a temporary location on a media server (block 924). The copied files may be restored from their temporary location to the application environment that is being restored (block 926). In one embodiment, a granular restore may be used to restore only a portion of the copied files. If there are not any application-associated files on the restored volumes (decision block 930) or on non-restored volumes (decision block 940), restoration is complete. If there are any application-associated files on the restored volumes (decision bock 930), the corresponding application-associated data objects within the restored volumes may be identified from references in a backup catalog (block 932). If there are any application-associated files on the non-restored volumes (decision bock 940), the corresponding volumes may be mounted on the media server (block 942), and the corresponding application-associated data objects within the mounted volumes may be identified from references in a backup catalog (block 944). The application-associated files may be restored from the mounted volumes to the application environment that is being restored (block 946), completing restoration.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
two or more storage volumes; and
a host, wherein the host is configured to initiate a backup operation, wherein as part of the backup operation the host is configured to:
identify an application to be backed up as part of the backup operation, said application being stored in part on a first storage volume and stored in part on a second storage volume;
perform a file-by-file backup of first files associated with the application which are stored on the first volume, wherein the first files are selectively backup up rather than the entire first storage volume;
perform a volume image backup of the second volume;
identify second files associated with the application which are stored on the second volume; and
store metadata comprising application-specific references to one or more data objects that correspond to the second files;
identify a state of the application to be restored;
perform a granular restoration of at least a portion of the first files; and use the metadata to perform a restoration of the second files.

2. The system as recited in claim 1, wherein third files not associated with the identified application are stored on the first volume and not included in the file-by-file backup.

3. The system as recited in claim 1, wherein the second files are not included in the file-by-file backup.

4. The system as recited in claim 1, wherein the host is further configured to store a backup dataset, the backup dataset comprising:
   file-by-file copies of the first files; and
   a volume image of the second volume.

5. The system as recited in claim 1, wherein the host is configured to store a backup catalog on a backup media server.

6. The system as recited in claim 1, wherein the host is further configured to:
   mount a volume image of the second volume on a media server;
   mount a copy of the first files on the media server; and
   perform the granular restoration of the at least a portion of the first files from the copy of the first files and a file-by-file restoration of the second files from the volume image.

7. A method comprising:
   initiating a backup operation, wherein the backup operation comprises:
      identifying an application to be backed up as part of the backup operation, said application being stored in part on a first storage volume and stored in part on a second storage volume;
      performing a file-by-file backup of first files associated with the application which are stored on the first volume, wherein the first files are selectively backup up rather than the entire first storage volume;
      performing a volume image backup of the second volume;
      identifying second files associated with the application which are stored on the second volume; and
      storing metadata comprising application-specific references to one or more data objects that correspond to the second files;
      identifying a state of the application to be restored;
      performing a granular restoration of at least a portion of the first files;
      using the metadata to perform a restoration of the second files.

8. The method of claim 7, wherein third files not associated with the identified application are stored on the first volume and not included in the file-by-file backup.

9. The method of claim 7, wherein the second files are not included in the file-by-file backup.

10. The method of claim 7, further comprising storing a backup dataset, the backup dataset comprising:
    file-by-file copies of the first files; and
    a volume image of the second volume.

11. The method of claim 7, further comprising storing a backup catalog on a backup media server.

12. The method as recited in claim 7, further comprising:
    mounting a volume image of the second volume on a media server;
    mounting a copy of the first files on the media server; and
    performing the granular restoration of the at least a portion of the first files from the copy of the first files and a file-by-file restoration of the second files from the volume image.

13. A non-transitory computer readable storage medium storing computer instructions that are executable by a processor to:
    initiate a backup operation, wherein as part of the backup operation the instructions are executable to:
       identify an application to be backed up as part of the backup operation, said application being stored in part on a first storage volume and stored in part on a second storage volume;
       perform a file-by-file backup of first files associated with the application which are stored on the first volume, wherein the first files are selectively backup up rather than the entire first storage volume;
       perform a volume image backup of the second volume;
       identify second files associated with the application which are stored on the second volume; and
       store metadata comprising application-specific references to one or more data objects that correspond to the second files;
       identify a state of the application to be restored;
       perform a granular restoration of at least a portion of the first files;
       use the metadata to perform a restoration of the second files.

14. The non-transitory computer readable storage medium as recited in claim 13, wherein third files not associated with the identified application are stored on the first volume and not included in the file-by-file backup.

15. The non-transitory computer readable storage medium as recited in claim 13, wherein the second files are not included in the file-by-file backup.

16. The non-transitory computer readable storage medium as recited in claim 13, wherein the instructions are further executable by the processor to store a backup dataset, the backup dataset comprising:
    file-by-file copies of the first files; and
    a volume image of the second volume.

17. The non-transitory computer readable storage medium as recited in claim 13, wherein the instructions are further executable by the processor to:
    mount a volume image of the second volume on a media server;
    mount a copy of the first files on the media server; and
    perform the granular restoration of the at least a portion of the first files from the copy of the first files and a file-by-file restoration of the second files from the volume image.

* * * * *

UNITED STATES PATENT AND TRADEMARK OFFICE
CERTIFICATE OF CORRECTION

PATENT NO.       : 8,903,777 B1                                Page 1 of 1
APPLICATION NO.  : 12/405747
DATED            : December 2, 2014
INVENTOR(S)      : Searls et al.

It is certified that error appears in the above-identified patent and that said Letters Patent is hereby corrected as shown below:

In the Claims:

Column 8, Claim 1, Line 57, delete "backup up" and insert -- backed up --.

Column 9, Claim 7, Line 34, delete "backup up" and insert -- backed up --.

Column 10, Claim 13, Line 21, delete "backup up" and insert -- backed up --.

Signed and Sealed this
Twenty-eighth Day of April, 2015

Michelle K. Lee
*Director of the United States Patent and Trademark Office*